United States Patent [19]

Nelson et al.

[11] 4,100,469
[45] Jul. 11, 1978

[54] HYBRID MOTOR STARTER

[75] Inventors: Terrance D. Nelson; Bruce G. Klippel, both of Milwaukee, Wis.

[73] Assignee: Allen-Bradley Company, Milwaukee, Wis.

[21] Appl. No.: 790,571

[22] Filed: Apr. 25, 1977

[51] Int. Cl.² .............................................. H02D 5/40
[52] U.S. Cl. ................................... 318/227; 318/230; 318/398; 318/416
[58] Field of Search ............... 318/227, 230, 397, 398, 318/416

[56] References Cited

U.S. PATENT DOCUMENTS

| 2,663,834 | 12/1953 | Large et al. | 318/398 X |
| 3,045,163 | 7/1962 | Collum | 318/227 |
| 3,143,694 | 8/1964 | Chiasson | 318/227 |
| 3,573,580 | 4/1971 | Shinozaki | 318/227 |
| 3,652,924 | 3/1972 | Dieterich et al. | 318/227 |
| 3,742,370 | 6/1973 | Hansen | 318/227 |
| 4,015,178 | 3/1978 | Phillot et al. | 318/227 |

*Primary Examiner*—Gene Z. Rubinson
*Attorney, Agent, or Firm*—Quarles & Brady

[57] ABSTRACT

Both solid state static control devices and electromagnetically operated contactors are employed in an a-c motor starter. The solid state control devices are operated by an acceleration control circuit to accelerate the motor during start-up. When synchronous speed is achieved, a run contactor is energized and its contacts are closed to conduct motor current. Under steady state conditions, therefore, the solid state control devices are bypassed.

6 Claims, 3 Drawing Figures

HYBRID MOTOR STARTER

BACKGROUND OF THE INVENTION

The present invention relates to motor starters, and particularly, motor starters for industrial applications which employ electromechanical contactors or static solid state devices for connecting and disconnecting electrical power to large motors.

There are two basic types of motor starters — electromechanical and static. The electromechanical motor starters employ contactors such as that disclosed in U.S. Pat. No. 4,006,440 issued on Feb. 1, 1977, in circuits such as those disclosed in U.S. Pat. Nos. 3,121,826 issued on Feb. 18, 1964 and 3,575,637 issued on Apr. 20, 1971. In contrast, solid state, static motor drives employ SCRs and triacs to control the power delivered to the motor and they are characterized by elaborate control circuits such as that disclosed in U.S. Pat. No. 3,614,596 issued on Oct. 19, 1971. Both types of motor starters have desirable characteristics and features which are unique to each.

SUMMARY OF THE INVENTION

The present invention relates to a hybrid motor starter in which static solid state devices are employed in combination with electromagnetic contactors. More specifically, the present invention comprises a pair of parallel conductive branches which provide power to an electric motor, the first branch including a solid state control device connected in series with the contacts of a start contactor, and the second branch including the contacts of a run contactor. A circuit which includes an acceleration control circuit operates the solid state device and the start and run contactors in a unique manner to incorporate the advantages of both static motor starters and contactor type motor starters.

A general object of the invention is to control the acceleration of the motor during start-up. The start contactor is energized during start-up and electrical power is coupled to the motor through the first branch which includes the solid state device. The acceleration control circuit operates the solid state device in response to motor speed and motor current feedback signals to control the acceleration of the motor.

Another general object of the invention is to minimize the energy dissipated in the solid state device. After the motor achieves its running speed the run contactor is energized and the start contactor is deenergized. As a result, motor current is coupled through the second branch and the solid state device is non-conductive and thus does not dissipate energy.

A more specific object of the invention is to provide complete isolation of the motor from the power lines. When the motor is off both contactors are deenergized and their associated contacts are open to open circuit both the first and second conductive branches.

Another more specific objective of the invention is to minimize the size of the start contactor. The start contactor is energized during start-up when the solid state device is in its non-conductive state. The run contactor is energized as soon as synchronous speed is achieved and it is this contactor which breaks motor current when the stop command is given. If a stop command occurs during start-up, the solid state device is turned off so that the start contactor is not called upon to break motor current.

A specific object of the invention is to minimize the size of the solid state device. Because the run contactor breaks motor current, the solid state device is not called upon to withstand the overvoltage created by the back emf of the motor as it decelerates.

Another general object of the invention is to provide an acceleration control circuit which accelerates the motor at a constant rate during start-up. A reference speed ramp signal is generated and compared with a motor speed feedback signal. The resulting error signal is coupled to control the operation of the solid state device and to thereby accelerate the motor at a rate indicated by the slope of the reference speed ramp signal.

Another object of the invention is to indicate a jam condition in which the motor speed does not increase at the desired rate and motor current increases sharply. A jam indicator circuit is provided which compares the speed feedback signal with the reference speed ramp signal and if the latter is greater than the former by a preselected amount a jam is indicated. A preselected time is measured before the shut-down procedure is initiated in order to allow time for the jam condition to clear.

A specific objective of the invention is to minimize the effect of a momentary jam condition on the motor start-up process. The jam indicator circuit is coupled to the reference speed ramp signal generator which operates to keep the reference level at a predetermined incremental level above the actual motor speed. If the jam clears before shut-down is instituted, the reference ramp is released and continues to rise at its preselected rate from the level at which it was clamped.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention and reference is made to the claims herein for interpreting the breadth of the invention.

DESCRIPTION OF THE PREFERRED EMBODIMENT

Figure 1:
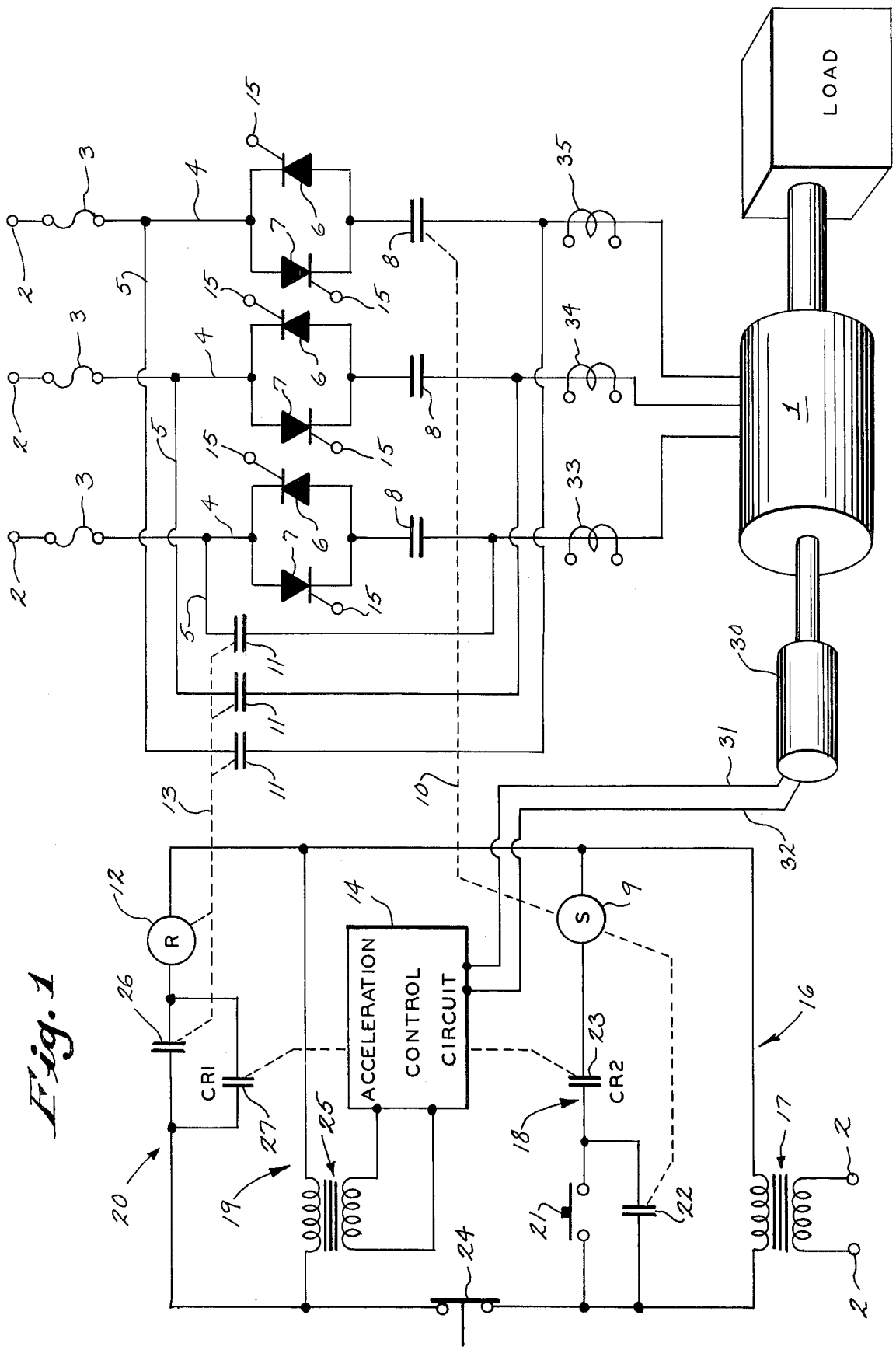
FIG. 1 is an electrical schematic diagram of the invented motor starter.

The motor starter delivers three-phase electrical power to an a-c motor 1 from a set of three power lines 2. The conductive paths which couple the lines 2 to the motor 1 are identical and each includes a main fuse 3 and a pair of conductive branches 4 and 5. Each of the branches 4 includes a pair of SCRs 6 and 7 which are connected in parallel with one another and oriented to conduct current in the opposite directions. Each branch 4 also includes a set of electrical contacts 8 which form a part of an electromagnetic contactor. The contacts 8 are magnetically and mechanically coupled to a coil 9 as indicated by the dashed line 10, and the contacts 8, coil 9 and their interconnection are referred to hereinafter as the "start" contactor.

The second branches 5 provide a second conductive path which shunts the SCRs 6 and 7 and the start contacts 8 in the first branch 4. The branches 5 include a set of electrical contacts 11 which form a part of an electromagnetic contactor which is referred to hereinafter as the "run" contactor. The run contactor includes a coil 12 which is magnetically and mechanically coupled to close the run contacts 11 when energized. This coupling is indicated by the dashed lines 13.

When both the start contactor and run contactor are deenergized, power is disconnected from the motor 1. When the start contactor is energized, the start contacts 8 close and three-phase power flows through the branches 4 to the motor 1. The RMS value of the current delivered to the motor 1 is controlled by the SCRs 6 and 7. The SCRs 6 and 7 are controlled through their gate terminals 15 by an acceleration control circuit 14, which operates in response to motor current and speed feedback signals to precisely control the operation of the motor 1 during start-up.

When the motor 1 reaches synchronous speed, the run contactor is energized to close the contacts 11 in the parallel conductive branches 5. The start contactor is then deenergized to open the contacts 8, and the conductive branches 4 are thus open circuited after synchronous speed has been achieved. The conductive branches 5 are operative during normal running as in a standard electromechanical motor starter.

The operation of the SCRs 6 and 7 and the operation of the start and run contactors is controlled by a circuit which is indicated in FIG. 1 at 16. The control circuit 16 includes a transformer 17 which has its primary winding connected across a pair of the power lines 2 and a secondary winding connected across three conductive branches 18, 19 and 20. The branch 18 provides power for the coil 9 in the start contactor and it includes a start pushbutton switch 21 connected in series with a set of contacts 23 which are operated by the acceleration control circuit 14. A set of contacts 22 associated with the start contactor are connected in parallel with the pushbutton switch 21. Under normal operating conditions the contacts 23 are held closed by the acceleration control circuit 14 and when the start pushbutton 21 is depressed, the coil 9 of the start contactor is energized. The energized coil 9 closes the contacts 22 to bypass the start pushbutton switch 21 and to thus latch the start contactor in its energized condition.

The branches 19 and 20 are coupled to the secondary of the transformer 17 through a stop pushbutton switch 24. The switch 24 is normally closed to conduct power to the branches 19 and 20, but when depressed, the circuit is opened to initiate the motor shut-down sequence described above.

The branch 19 includes the primary winding of a transformer 25. The secondary winding of the transformer 25 provides a signal to the acceleration control circuit 14 which indicates whether the stop pushbutton switch 24 has been depressed.

The branch 20 includes the coil 12 of the run contactor and it is connected in series with a set of contacts 27 which are controlled by the acceleration control circuit 14. The contacts 27 are normally open, but are closed by the acceleration control circuit 14 when the motor 1 reaches synchronous speed. The coil 12 is thus energized and a set of contacts 26 associated with the run contactor are closed to latch the run contactor in its energized state.

It should be apparent to those skilled in the art that protective devices such as overload relays and thermostats as well as protective circuits such as phase reversal and phase failure detection circuits may be employed in the control circuit 16 to protect the motor 1 from malfunctions. Such devices are most appropriately connected in series with the stop pushbutton switch 24.

Figure 2:
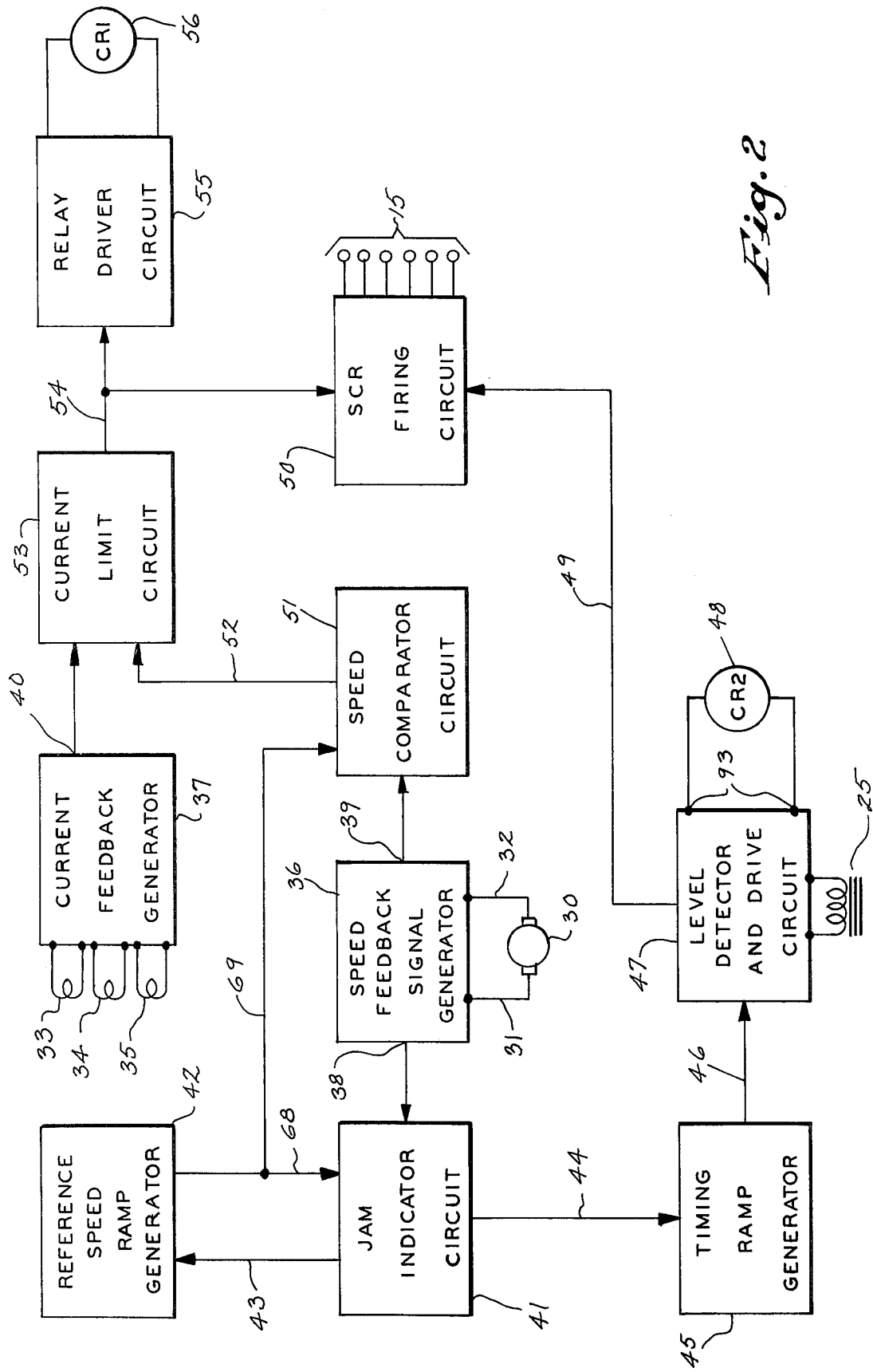
FIG. 2 is a block diagram of the acceleration control circuit which forms part of the motor starter of FIG. 1.

Referring to FIGS. 1 and 2, the acceleration control circuit 14 receives feedback information from the motor 1 and generates control signals which operate the SCRs 6 and 7 and the contacts 23 and 27. A tachometer 30 is mechanically coupled to the motor 1 and it is electrically connected through a pair of lines 31 and 32 to the acceleration control circuit 14. The voltage generated by the tachometer 30 across the lines 31 and 32 is proportional in magnitude to the speed of the motor 1. Additional feedback information is provided by a set of three current transformers 33, 34 and 35 which couple to the respective power lines entering the motor 1. These also electrically connect to the acceleration control circuit 14 and the signal which they generate is proportional to motor current.

Referring particularly to the acceleration control circuit in FIG. 2, the tachometer 30 connects to a speed feedback signal generator circuit 36 and the current transformers 33-35 connect to a current feedback generator circuit 37. The speed feedback signal generator 36 provides a negative d-c voltage at outputs 38 and 39 which is proportional to motor speed and the current feedback generator 37 provides a positive d-c voltage at an output terminal 40 which is proportional to the sum of the current flowing in the power lines 2.

The speed feedback signal generated at the output terminal 38 is applied to a jam indicator circuit 41 which also receives a reference speed signal generated by a reference speed ramp generator 42. The ramp generator 42 generates a voltage which increases in amplitude linearly as a function of time and which represents the desired motor acceleration during start-up. The slope of this ramp can be manually changed to alter motor acceleration during start-up.

The jam indicator circuit 41 compares the magnitude of the reference speed ramp signal with the magnitude of the actual speed feedback signal to determine whether or not a jam condition has occurred. If the reference speed ramp signal exceeds the actual motor speed feedback signal by a value which represents more than 15% of motor synchronous speed, the motor 1 or its load is presumed to be jammed. When this occurs, signals are generated by the jam indicator circuit 41 through a line 43 to the reference speed ramp generator 42 and through a line 44 to a timing ramp generator 45.

If a jam condition persists for five seconds, the timing ramp generator 45 couples a signal through a line 46 to a level detector and drive circuit 47. The level detector and drive circuit 47 responds by deenergizing a coil 48 which opens the contacts 23 shown in the control circuit 16 of FIG. 1. The level detector and drive circuit 47 also generates a signal through a line 49 to an SCR firing circuit 50. The SCR firing circuit 50 is similar to that disclosed in U.S. Pat. No. 3,596,112 issued to Terrance D. Nelson on July 27, 1971, and it include a set of six outputs which connect through the leads 15 to the gates of the SCRs 6 and 7 shown in FIG. 1. The signal applied to the SCR firing circuit 50 through the line 49 phases back the SCRs 6 and 7 to their nonconductive state.

During normal start-up, the speed feedback signal generated at the output 39 on the speed feedback signal generator 36 is applied to a speed comparator circuit 51 where it is compared with the reference speed signal generated by the reference speed ramp generator 42. An error signal proportional in magnitude to the difference between the speed feedback signal and the reference speed ramp signal is generated through a lead 52 to a current limit circuit 53. The current limit circuit 53 also receives the current feedback signal from the current feedback generator 37. A speed command signal is generated on a line 54 and is applied to the SCR firing circuit 50 and to a relay driver circuit 55.

The current limit circuit 53 operates to limit the magnitude of the speed command signal on the line 54 such that excessive motor current will not be demanded. Such a demand might occur, for example, when a jam condition is present and the motor speed drops considerably below the reference speed ramp signal. During a normal start-up, however, the speed command signal on the line 54 controls the conduction angle of the SCRs 6 and 7 such that the actual motor speed closely follows the reference speed to provide a constant acceleration.

When the motor 1 reaches synchronous speed, the reference speed ramp continues to rise but the actual motor speed levels off. As a result, the speed command signal on the line 54 increases dramatically and eventually operates the relay driver circuit 55. When thus operated, the relay driver circuit 55 energizes a relay coil 56 which closes the contacts 27 shown in the control circuit 16 of FIG. 1. The run contactor is thus energized when synchronous speed is achieved. Shortly thereafter, the level detector and drive circuit 47 operate to deenergize the coil 48 and to thus drop out the start contactor.

Figure 3:
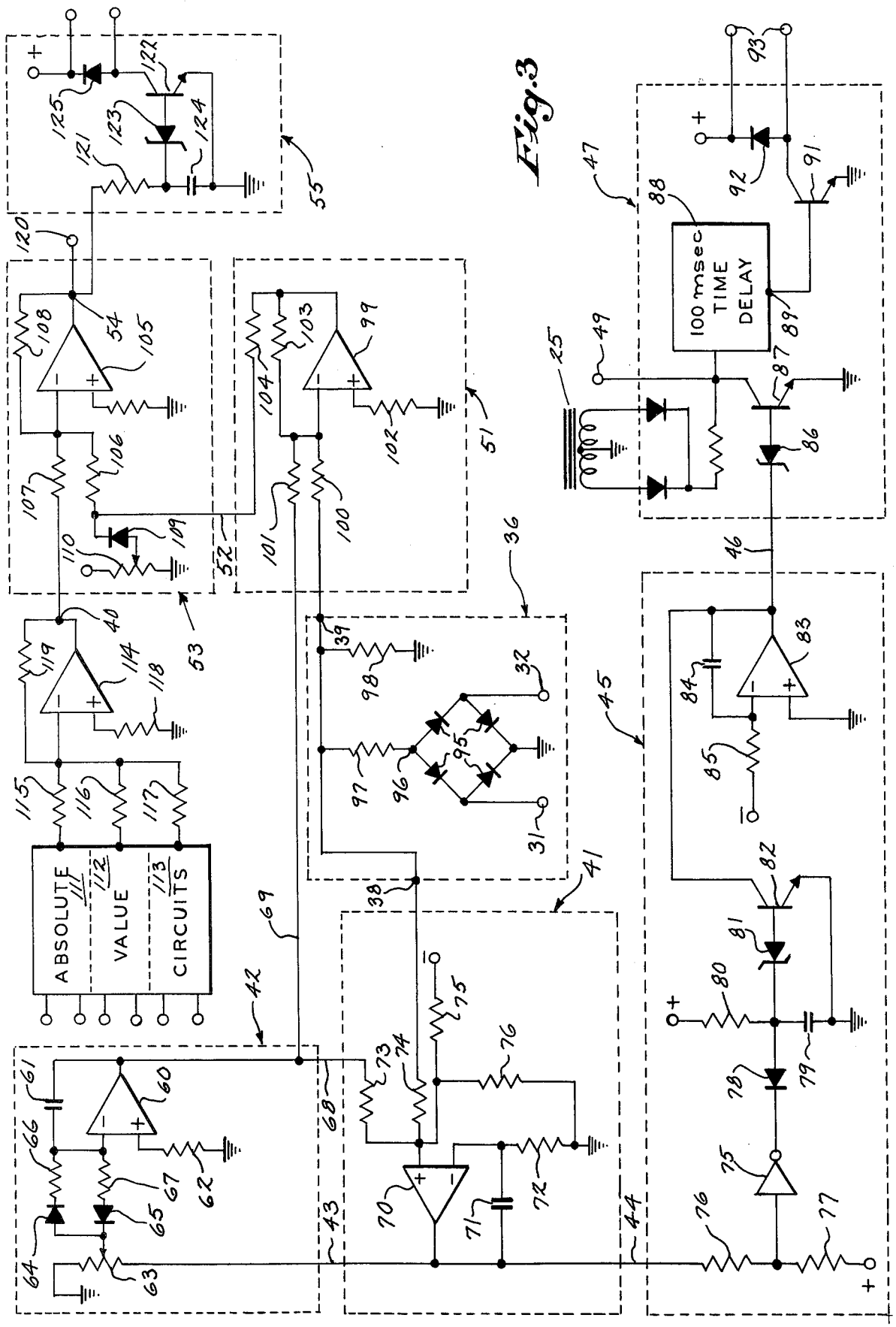
FIG. 3 is an electrical schematic diagram of the acceleration control circuit.

Referring to FIG. 3, the reference speed ramp generator 42 is comprised of an integrator which includes an operational amplifier 60, a feedback capacitor 61 and a grounding resistor 62. The inverting input on the operational amplifier 60 is driven by a voltage received from a potentiometer 63 through either of two conductive paths formed by diodes 64 and 65 and resistors 66 and 67. One end of the potentiometer 63 is connected to signal ground and its other is connected to the lead 43 which emanates from the jam indicator circuit 41. During start-up and under normal operating conditions, the lead 43 is held near the negative d-c supply voltage and current flows through the feedback capacitor 61, through the resistor 67 and diode 65. The capacitor 61 charges linearly as a function of time and the output of the operational amplifier 60 rises toward the positive d-c supply voltage. A positive linear ramp function is thus generated through leads 68 and 69 to the jam indicator circuit 41 and the speed comparator circuit 51, respectively.

The jam circuit 41 is comprised primarily of an operational amplifier 70 which has its output terminal connected to the leads 43 and 44. Although a feedback capacitor 71 is provided between the inverting input and the output of the operational amplifier 70, its value is very small and its purpose is solely for circuit stability. The inverting input on the operational amplifier 70 connects to signal ground through a resistor 72 and its noninverting input serves as a summing point for three applied currents. The first current is received through a coupling resistor 73 from the reference speed ramp generator 42 and is positive in value. The second current is received through a resistor 74 from the output 38 of the speed feedback signal generator 36 and the third current is a fixed value established by a pair of dividing resistors 75 and 76. The sign of the latter two currents is negative and thus the operational amplifier 70 serves to compare the magnitude of the reference speed signal with the magnitude of the sum of the feedback speed signal and the signal generated by the divider resistors 75 and 76. The current generated by the divider resistors 75 and 76 is selected to effectively add to the speed feedback signal a value representative of 15% of motor synchronous speed.

If the magnitude of the current coupled to the amplifier 70 through the resistor 73 exceeds the sum of the other two current sources a jam condition is present and the output of the operational amplifier 70 is driven to positive saturation. In addition to generating a positive voltage to the timing ramp generator 45 through the lead 44, the positive output of the operational amplifier 70 begins to discharge the feedback capacitor 61 in the reference speed ramp generator 42. Because the circuits 42 and 41 are connected in a closed loop, an equilibrium is soon established in which the charge on the feedback capacitor 61 remains constant. Thus, when a jam condition occurs, the reference speed ramp signal remains at a level corresponding to a speed which is a preselected value above actual motor speed.

The timing ramp generator 45 includes an inverter gate 75 which is driven by a voltage divider comprised of resistor 76 connected to lead 44 and resistor 77 connected to a positive d-c supply terminal. The inverter gate is coupled through a coupling diode 78 and through a noise filter comprised of a capacitor 79 and resistor 80 to the anode of a zener diode 81. The zener diode 81 establishes a threshold voltage which, when exceeded, turns on a switching transistor 82. The collector of the switching transistor 82 connects to the output of an integrator comprised of operational amplifier 83, feedback capacitor 84 and resistor 85.

Under normal operating conditions lead 44 is held at the negative supply voltage by the jam indicator circuit 41 and the output of inverter gate 75 is driven to the positive supply voltage. Capacitor 79 quickly charges to the breakdown voltage of the zener diode 81 and the transistor 82 is driven into saturation. The output of the operational amplifier 83 is thus held at a voltage slightly above signal ground. When a jam condition occurs the lead 44 goes positive and the output of inverter gate 75 goes to zero. Capacitor 79 is discharged through the coupling diode 78 and as a result, the transistor 82 is switched off. The output of the operational amplifier 83 is thus allowed to rise in response to the current flowing out of its inverting input through the resistor 85.

The output of the operational amplifier 83 is coupled through the lead 46 to the anode of a zener diode 86 in the level detector and drive circuit 47. The slope of the ramp output voltage of the operational amplifier 83 is selected such that it will reach a voltage sufficient to break down the zener diode 86 in approximately five seconds after the switching transistor 82 is turned off. When this occurs a transistor 87 is driven into saturation and its collector is thus driven to a voltage slightly above signal ground. This low voltage is coupled through the lead 49 to the SCR firing control circuit 50 and is applied to the input of a 100 millisecond time delay 88. The low voltage on the lead 49 drives the SCRs 6 and 7 to their fully nonconductive state and 100 milliseconds later causes a logic low voltage to be generated at an output 89 on the time delay 88. The collector of transistor 87 is normally held at a positive d-c voltage supplied from the secondary winding of transformer 25.

A driver transistor 91 has its base connected to the output 89, its emitter connected to signal ground and its collector connected through a diode 92 to a positive d-c supply terminal. The relay coil 48 connects across the diode 92 to terminals 93, and when the transistor 91 is turned off in response to a jam condition which persists for more than 5 seconds, the relay coil 48 is deenergized to open the contacts 23 in series with the start contactor coil 9. The 100 millisecond time delay provided by circuit 88 insures that the start contactor is deenergized only after the SCRs are fully nonconductive.

The speed feedback signal generator 36 is comprised of a full-wave bridge rectifier circuit which includes four diodes 95. The negative output terminal 96 of the bridge rectifier circuit is connected to a voltage divider comprised of resistors 97 and 98. The juncture of the resistors 97 and 98 forms the outputs 38 and 39 of the circuit 36.

The speed comparator circuit 51 is comprised primarily of an operational amplifier 99 which receives at its inverting input the speed feedback signal and the reference speed signal. The speed feedback signal is coupled through a summing resistor 100 and the reference speed signal is coupled through a second summing resistor 101. A resistor 102 connects the non-inverting input on the operational amplifier 99 to signal ground and a feedback resistor 103 connects to its output. The negative speed feedback signal is summed with the positive reference speed signal and the resulting negative error signal is coupled through a resistor 104 to the lead 52. The magnitude of this error signal is proportional to the difference between the desired speed and the actual motor speed.

The current limit circuit 53 includes an operational amplifier 105 which receives the negative error signal through a summing resistor 106 and the current feedback signal through a summing resistor 107. A feedback resistor 108 connects its output to its inverting input and its output terminal connects to the lead 54. The circuit 53 also includes a diode 109 and a potentiometer 110 which limit the voltage on the lead 52 to a fixed maximum negative voltage. The potentiometer is set such that the negative error signal on the lead 52 will not exceed a value which would result in the motor 1 drawing excessive current. This might occur, for example, during a jam condition before the five-second timing ramp generator times out.

The current feedback generator 37 is comprised of three absolute value circuits 111-113 having outputs which are coupled to the inverting input of an operational amplifier 114 through respective summing resistors 115-117. A resistor 118 connects the noninverting input of operational amplifier 114 to signal ground and a feedback resistor 119 connects to its output. The absolute value circuits 111-113 full-wave rectify the a-c signals received from the current transformer 33-35 and the resulting rectified signals are summed by the amplifier 114 to generate the current feedback signal. Absolute value circuits such as those disclosed in "Handbook of Operational Amplifier Applications" published by Burr Brown Research Corporation in 1963 are preferred although a full-wave bridge rectifier circuit is also possible.

The command signal generated on the lead 54 by the current limit circuit 53 is applied to the SCR firing circuit 50 through a lead 120 and to a coupling resistor 121 in the relay driver circuit 55. The command signal controls the firing angle of the SCRs 6 and 7 to maintain a constant acceleration during start-up.

The relay driver circuit 55 includes a switching transistor 122 which has its base connected to the coupling resistor 121 through a zener diode 123. A noise filter capacitor 124 connects the anode of zener diode 123 to signal ground and the breakdown voltage of the zener diode is selected to establish a threshold which will drive the transistor 122 into saturation when the motor 1 reaches synchronous speed. More specifically, when synchronous speed is reached the error signal on the lead 52 increases to the maximum value allowed by the clamping diode 109. The current feedback signal on the lead 40 decreases when synchronous speed is achieved and the zener diode breaks down to turn on the transistor 122. The collector of transistor 122 connects through a diode 125 to a positive d-c supply terminal. The coil 56 which operates the contacts 27 is connected across diode 125 and thus when transistor 122 is turned on, the run contactor is energized.

We claim:

1. A motor starter for coupling current from a power line to a motor, the combination comprising:
   a first conductive branch connected between the power line and the motor, said first conductive branch including a solid state device suitable for controlling current in said first branch and a set of series connected contacts associated with a start contactor;
   a second conductive branch connected between the power line and the motor in shunt with said first conductive branch, said second conductive branch including a set of contacts associated with a run contactor; and
   a control circuit which includes:
   (a) a start switch;
   (b) means coupled to said start switch for energizing said start contactor when said start switch is operated;
   (c) means coupled to said solid state device for driving it from its nonconductive state to its conductive state after said start contactor is energized;
   (d) speed feedback means coupled to said motor for sensing motor speed;
   (e) means coupled to said speed feedback means for energizing said run contactor when said motor reaches a preselected speed; and
   (f) means coupled to said start contactor for deenergizing the same after said run contactor is energized.

2. The motor starter as recited in claim 1 in which said control circuit further includes:
   (g) ramp generator means for generating a reference signal indicative of the desired acceleration of the motor; and
   (h) speed comparator means coupled to said ramp generator means said speed feedback means, said speed comparator means being operable to generate a signal to said means for driving said solid state device which is proportional to the difference in actual motor speed and the speed indicated by said reference signal.

3. The motor starter as recited in claim 2 in which said control circuit further includes:

(i) jam indicator means coupled to said speed feedback means and said ramp generator means, said jam indicator means being operable to generate a jam indication signal when the speed indicated by said reference signal exceeds actual motor speed by a preselected amount; and (j) means coupled to receive said jam indication signal for driving the solid state device to its nonconductive state when a jam is indicated and for deenergizing said start contactor a preselected time interval thereafter.

4. The motor starter as recited in claim 3 in which said means for driving the solid state device to its nonconductive state includes timing means which inhibits the operation thereof until said jam indication signal is present for a preselected time interval.

5. In a motor starter having solid state devices for controlling the current flowing to a motor, the improvement therein comprising:

means coupled to said solid state device for driving it from its nonconductive state to its conductive state;

speed feedback means coupled to said motor for sensing motor speed and for generating a speed feedback signal proportional thereto;

reference generator means for generating a reference signal indicative of the desired acceleration of the motor;

jam indicator means coupled to receive said speed feedback signal and said reference signal and being operable to generate a jam indication signal when the reference speed signal exceeds the speed feedback signal by a preselected amount;

timing means coupled to receive said jam indication signal and being operable to generate a shut-down signal when said jam indication signal is present for a preselected time interval; and means coupled to receive said shut-down signal and to drive said solid state device to its nonconductive state.

6. The improvement as recited in claim 5 in which the output of said jam indicator means is coupled to said reference generator means to clamp the reference signal generated thereby to a value indicative of a speed which is a preselected amount greater than the speed indicated by said feedback signal.

* * * * *